United States Patent [19]
Liao

[11] Patent Number: 5,467,172
[45] Date of Patent: Nov. 14, 1995

[54] IMAGE SCANNER TRANSPARENCY ADAPTOR

[76] Inventor: Chun-Chi Liao, No. 9 Lane 126 Min-Sheng Road, Taichung City, Taiwan

[21] Appl. No.: 259,983

[22] Filed: Jun. 15, 1994

[51] Int. Cl.$^6$ ............................................. G03G 21/00
[52] U.S. Cl. ................................... 355/231; 358/487
[58] Field of Search ................... 355/75, 230, 231; 358/487, 506; 362/307, 310

[56] References Cited

U.S. PATENT DOCUMENTS

| | | | |
|---|---|---|---|
| 4,014,607 | 3/1977 | Cherian | 355/75 X |
| 4,989,099 | 1/1991 | Koshiyouji et al. | 358/474 |
| 5,119,212 | 6/1992 | Mori et al. | 358/474 |
| 5,239,392 | 8/1993 | Suzuki et al. | 358/474 |
| 5,276,534 | 1/1994 | Mutze et al. | 358/487 |
| 5,381,245 | 1/1995 | Johnston et al. | 358/487 |
| 5,392,100 | 2/1995 | Yoshida | 355/75 X |
| 5,430,289 | 7/1995 | Erickson et al. | 250/205 |

Primary Examiner—Robert Beatty
Attorney, Agent, or Firm—Ostrolenk, Faber, Gerb & Soffen

[57] ABSTRACT

A transparency adaptor for use in a flat bed type image scanner. The transparency adaptor which is to be displaced on the image window of the image scanner to project uniform "planar" light through a light-transmittable medium on which image to be scanned is printed so as to eliminate the need of complicated and sophisticated line light source upon the scanning window includes a shallow panel like casing inside which a pair of cold cathode fluorescent lamps (CCFLs) are disposed in a spaced and opposite manner to project light toward each other. A plate-like lighting guide is disposed between the CCFLs to uniformly distribute the light through a given planar area. A reflection sheet is provide to direct the light generated by the CCFLs toward a desired orientation. Light diffusers may be disposed along the out-going path of the light to more uniformly distribute the light through the given area. A cable is provided to supply direct current from the image scanner to an inverter mounted inside the transparency adaptor which converts the direct current to alternate current for starting the CCFLs.

11 Claims, 4 Drawing Sheets

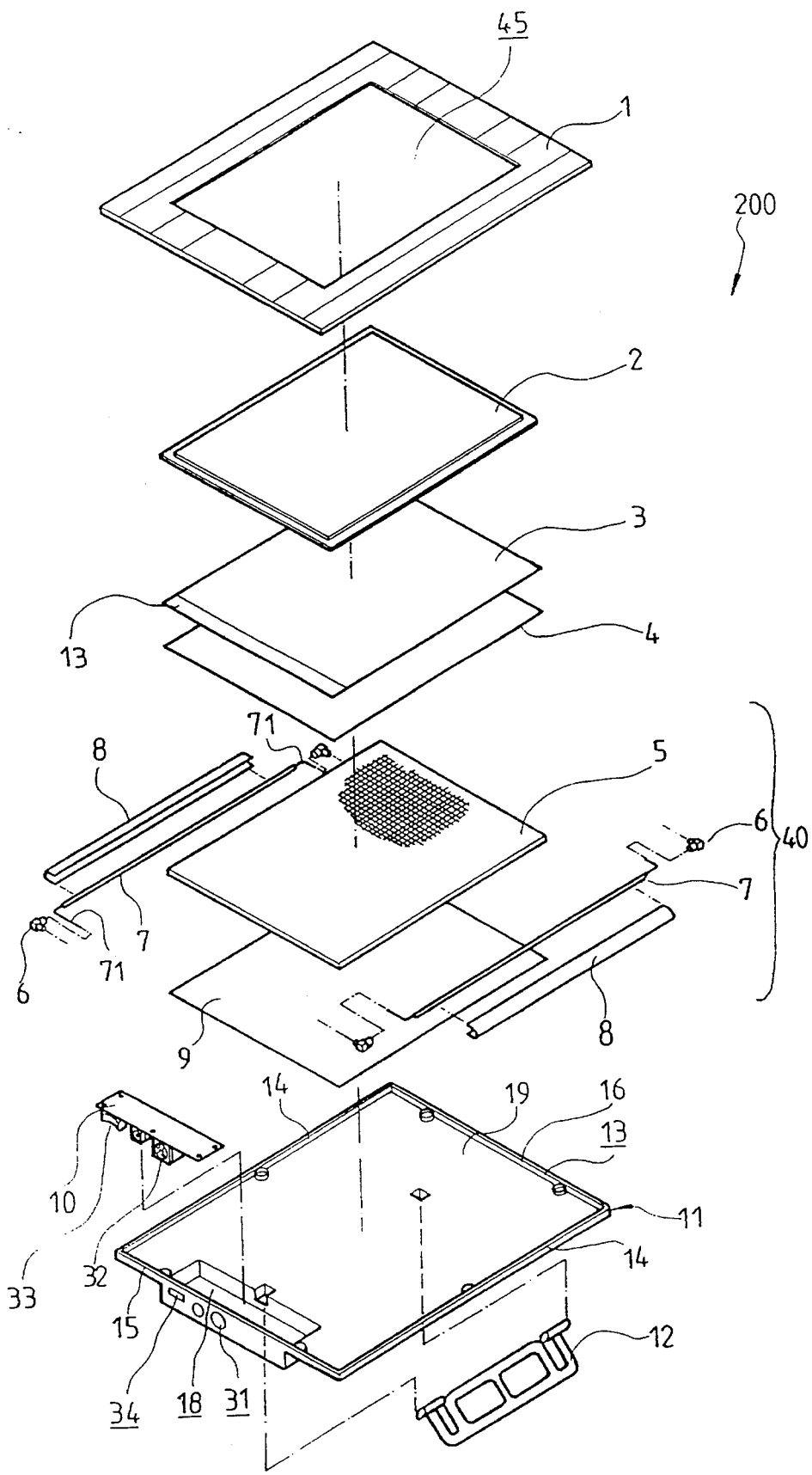
FIG·4

IMAGE SCANNER TRANSPARENCY ADAPTOR

FIELD OF THE INVENTION

The present invention relates generally to an image scanner and in particular to a transparency adaptor for use in a flat bed type or handy type image scanner.

BACKGROUND OF THE INVENTION

Flat bed type image scanners have been widely used to "read" images formed on sheet-like media, such as paper or film. The flat bed type image scanners usually comprise a box-like machine body on which a light-transmitting image window is formed. Paper or film on which image to be scanned is printed is placed on the image window. For reading images on non-transparent media, such as paper, a paper cover is provided to cover the image window with the paper to be scanned disposed therebetween. A line light source which is disposed inside the box-like machine body to project light to the paper to be scanned moves inside the machine body from one end to the other end to allow the paper to be fully scanned by the light. Reflection of the scanning light provides information of the image printed on the paper to the scanner. The scanner receives the reflected light and further processes it to provide desired signal.

For scanning a substantially transparent medium, such as a film, back lighting provided by a back lighting module disposed on the film is a must for the scanning operation. The back lighting module which is displaced on the position of the paper cover emits light from the back side of the film and the light so emitted transmits through the film and is then projected toward an optical reading module inside the image scanner.

The light source for a conventional image scanner, for scanning both transparent and non-transparent media is complicated and sophisticated in structure and design and thus cost in manufacturing and maintenance.

It is therefore desirable to provide a transparency adaptor for use in a flat bed type image scanner to facilitate the reading of images printed on light-transmittable medium.

SUMMARY OF THE INVENTION

The principal object of the invention is to provide a transparency adaptor for use in a flat bed type and handy type image scanner which is placed on the image window of the flat bed type image scanner (or handy scanner) to project uniform "planar" light from the back side of a light-transmittable medium on which the image to be scanned is printed and the light passing through the medium reaches the light signal receiving member inside the image scanner to reveal the image to the image scanner.

In accordance with the present invention, there is provided a transparency adaptor for use in a flat bed type or handy type image scanner which is to be displaced on the image window of the image scanner to project uniform "planar" light through a light-transmittable medium on which image to be scanned is printed so as to eliminate the need of complicated and sophisticated line light source upon the scanning window. The transparency adaptor comprises a shallow panel like casing inside which a pair of cold cathode fluorescent lamps (CCFLs) are disposed in a spaced and opposite manner to project light toward each other. A plate-like lighting guide is disposed between the CCFLs to uniformly distribute the light through a given planar area. A reflection sheet is provide to direct the light generated by the CCFLs toward a desired orientation. Light diffusers may be disposed along the out-going path of the light to more uniformly distribute the light through the given area. A cable is provided to supply direct current from the image scanner to an inverter mounted inside the transparency adaptor which converts the direct current to alternate current for starting the CCFLs.

BRIEF DESCRIPTION OF THE DRAWINGS

The present invention will be better understood from the following description of a preferred embodiment thereof, with reference to he attached drawings, wherein:

FIG. 4 is an exploded perspective view, observed from an inverted direction of that of FIGS. 1–3, showing the transparency adaptor constructed in accordance with the present invention.

DETAILED DESCRIPTION OF THE PREFERRED EMBODIMENT

Figure 1:
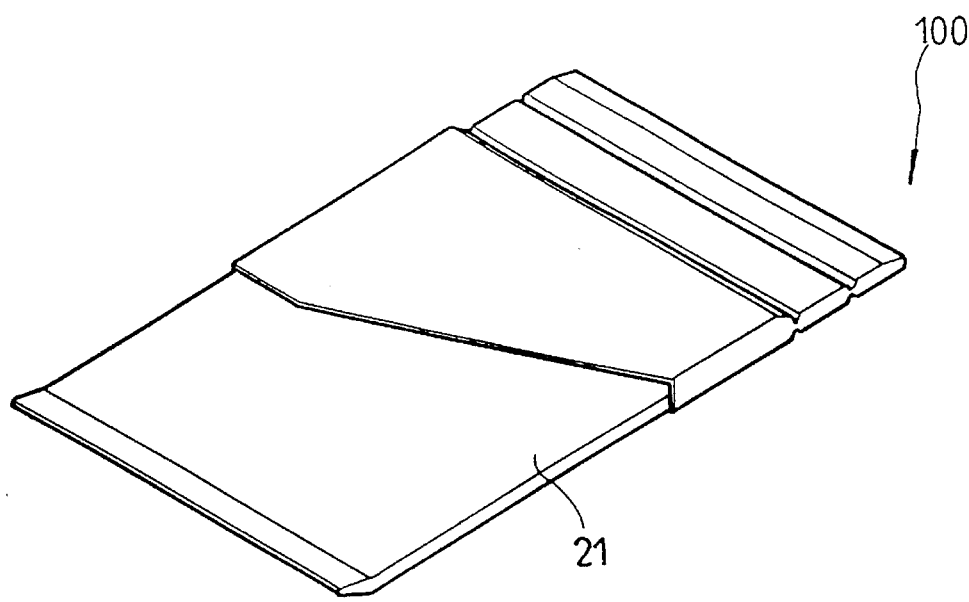
FIG. 1 is a perspective view showing a flat bed type image scanner, with the paper cover detached therefrom, to which a transparency adaptor constructed in accordance with the present invention is to be mounted.
Figure 1:
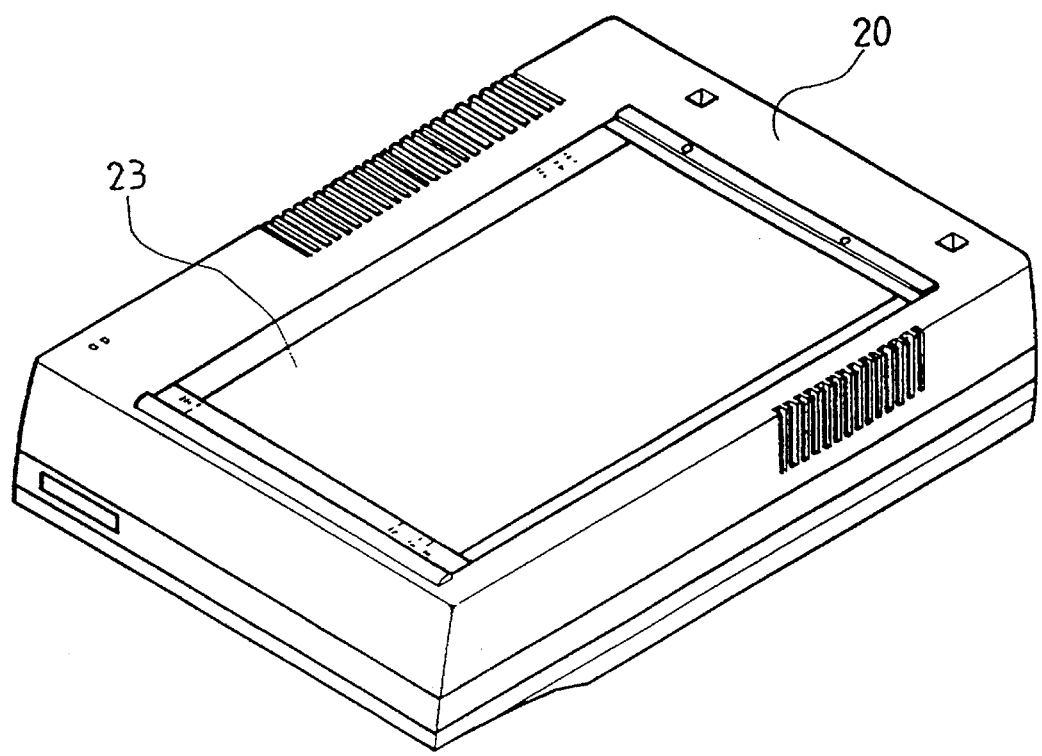

With reference to FIG. 1, which shows a flat bed type image scanner 100 on which a transparency adaptor constructed in accordance with the present invention is to be mounted, the flat bed type transparency adaptor 100 generally comprises a scanning machine 20 having an image window 23, made of a transparent material, such as glass, mounted thereon. Image that is printed on a sheet-like medium, such as paper or film 30 (FIG. 3), to be scanned by the image scanner 100 is placed on the image window 23. A line light source (not shown) is movably disposed inside the scanning machine 20 to generate scanning light which projects through the image window 23 and is reflected by the image printed on the sheet-like medium to transmit the image back to the image scanner 100. In general, a paper cover 21 is provided to substantially completely cover the image window 23 for elimination of interference of external light source during scanning operation. Usually, the paper cover 21 is secured to the scanning machine 20 in a releasable manner.

To avoid interference due to the external light source during scanning a transparent medium, such as a film, the image window 23 must be completely sheltered by the paper cover 21.

Figure 2:
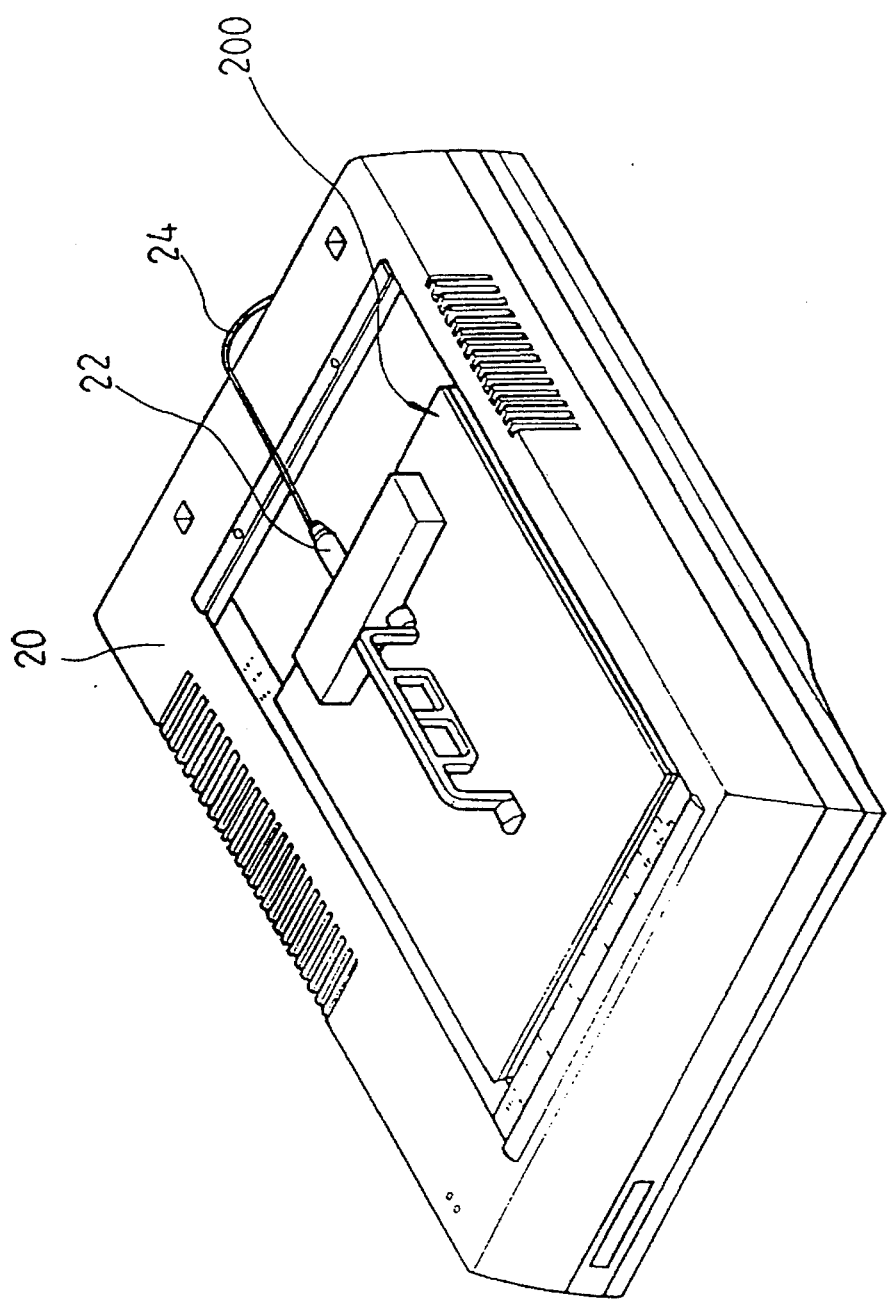
FIG. 2 is a perspective view of a flat bed type image scanner with the transparency adaptor of the present invention mounted thereon.
Figure 3:
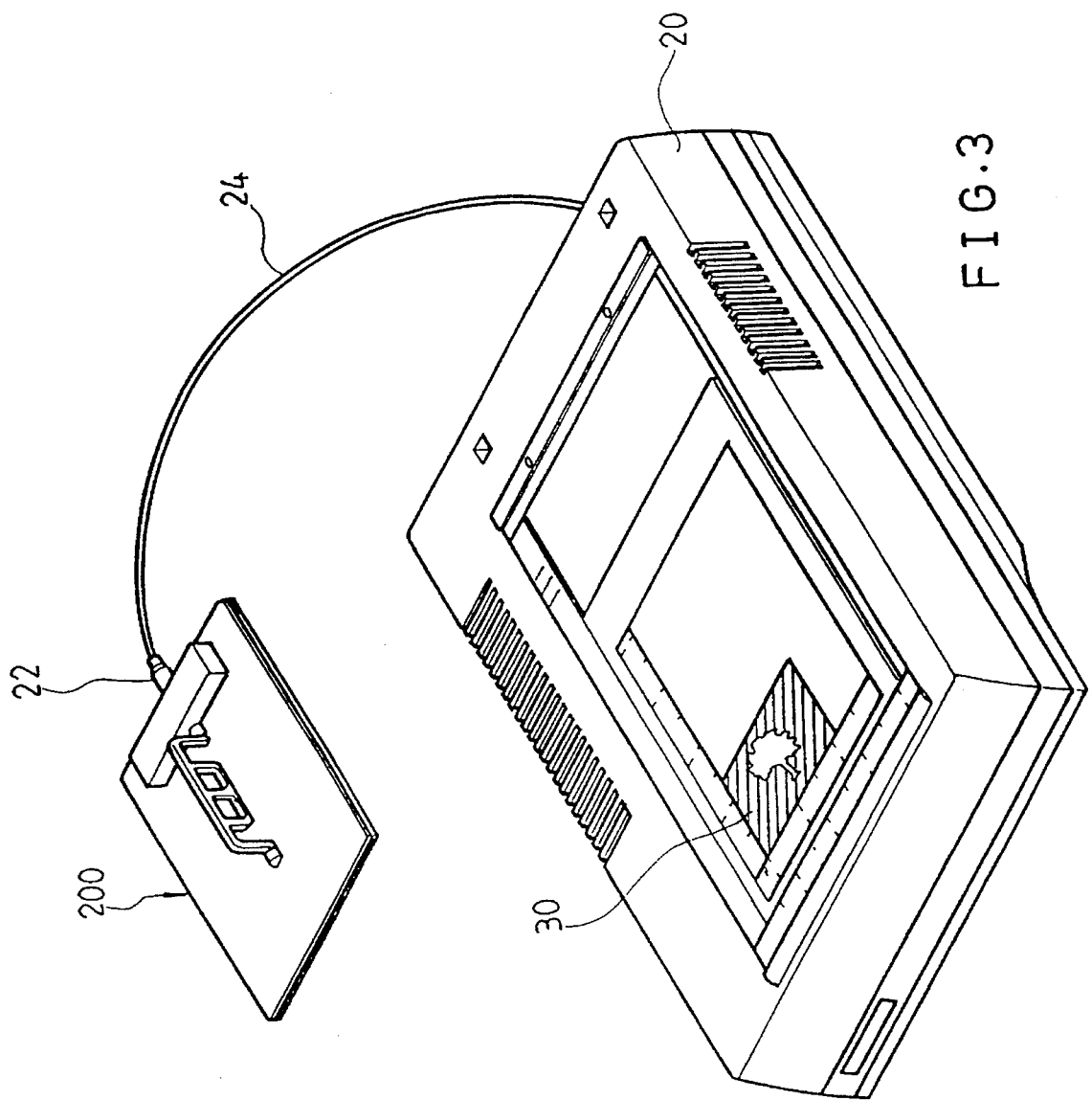
FIG. 3 is a perspective view of the flat bed type image scanner and the transparency adaptor of the present invention, with the transparency adaptor separated from the scanner machine for disposition of a film to be scanned.

Because of the reason discussed previously in the section of BACKGROUND OF THE INVENTION, it is desirable to provide means which emits light, from the back side of a light-transmittable or transparent medium to be scanned, through the transparent medium to project the image on the transparent medium to the scanning machine 20, rather than using the reflected light from the paper cover 21 to read the image. In accordance with the present invention, a transparency adaptor, generally designated with the reference numeral 200 in FIGS. 2–4, is provided to be displaced on the image window 23 of the scanning machine 20 for the provision of light projected through the transparent medium from the back side thereof. In this case, the complicated line light source can be eliminated from the image scanner 100 and this is of course advantageous over the conventional flat bed type image scanners.

With reference to FIGS. 2 and 3, wherein a transparency adaptor 200 constructed in accordance with the present invention is shown mounted to an image scanner 100 of flat bed type of which the paper cover is removed for the mounting of the transparency adaptor 200. The transparency adaptor 200 is further shown in FIG. 4 which is an exploded perspective view of the transparency adaptor 200, observed in an inverted way, namely the transparency adaptor 200 is shown up side down in FIG. 4 as compared to that shown in FIGS. 2 and 3.

The transparency adaptor 200 is mounted to the image scanner 100 in such a manner that it is placeable on the image window 23 to cover a substantial area of the image window 23. To provide electricity to the transparency adaptor 200, a cable 24 extends out of and in electrical connection with the scanning machine 20 of the image scanner 100 is connected to the transparent adaptor 200 by means of a connector 22 (FIGS. 2 and 3), which connection will be further discussed hereinafter.

Further referring to FIG. 4, the transparency adaptor 200 constructed in accordance with the present invention comprises a casing 11 in the form of a rectangular shallow panel to receive therein parts that constitute the transparency adaptor 200. The rectangular shallow panel like casing 11 comprises a base plate 19 with two opposite lateral side walls 14, a rear side wall 15 and a front side wall 16 mounted to periphery of the base plate 19 in a perpendicular manner to define an opening 13 for the entry of the parts.

A cover plate 1, with a central opening 45 formed thereon is secured on the open side of the casing 11, opposite to the base plate 19, to close the opening 13 thereof to define an interior space for disposal of and retaining the parts therein.

Inside the interior space of the casing 11, a lighting module 40 is disposed. The light module 40 comprises a pair of elongated tubular cold cathode fluorescent lamps (CCFLs) 7 disposed along and inside the two opposite lateral side walls 14 of the casing 11 so as to be opposite to and spaced from each other. Each of the two CCFLs 7 has two ends supported and secured to the casing 11 by a pair of insulating caps 6, such as rubber caps, with end terminals 71 of the CCFL 7 extending through the rubber caps 6 to connect to an inverter 10 to be described further hereinafter.

Each of the CCFLs 7 has a light reflection member 8, preferably made of an aluminum film in the form of a U-shaped channel member, disposed between the CCFL 7 and the lateral side wall 14 of the casing 11 to reflect the light generated by the CCFL toward each other and thus toward an area of the casing 11 therebetween. The lighting module 40 further comprises a lighting guide 5 disposed inside the casing 11 at a location slightly above the CCFLs 7 (as viewed in FIG. 4), but centered between the CCFLs 7. The lighting guide 5 is a plate like member which covers a substantial area of the base plate 19 to make the light generated by the CCFLs 7 uniformly distributed through the area covered by the lighting guide 5.

To direct the light to project out through the central opening 45 of the cover plate 1, a reflection sheet 9 having a surface area substantially equal to the lighting guide 5 is disposed between the base plate 19 of the casing 11 and the lighting module 40, substantially opposing the lighting guide 5, to reflect all the light toward the central opening 45 of the cover plate 1.

To further uniformly distribute the light projecting out of the central opening 45 of the cover plate 1, at least one plate-like diffuser 3 is displaced between the cover plate 1 and the lighting guide 5. In the embodiment illustrated, a second diffuser plate 4 is disposed between the lighting guide 5 and the first diffuser 3 to further improve light distribution. The first diffuser 3 may comprise a calibration sheet 13 attached thereto for white light calibration.

A transparent sheet 2, such as glass or acrylic sheet, is sized to cover the central opening 45 of the cover plate 1 to provide protection and prevent dirt from getting into the interior space of the casing 11.

The casing 11 further comprises a recess 18 formed next to the rear side wall 15 thereof to accommodate the invertor 10. The inverter 10 comprises electric circuit and electronic elements to convert the direct current supplied from the image scanner 100 via the cable 24 to an alternate current for starting the CCFLs 7. The rear side wall 15 of the casing 11 has at least a hole 31 formed thereon to allow the connector 22 of the cable 24 to extend therethrough to joint to a socket 32 of the inverter 10 for establishing electrical connection therebetween. The inverter 10 is also provided with a power switch 33 which is accessible through a slot 34 formed on the rear side wall 15 of the casing 11 to control electricity flowing through the connector-socket pair (22 and 32).

To provide easy handling, a handle 12 is pivotally mounted on the casing 11 so that an operator may lift the transparency adaptor 200 away from the image window 23 of the image scanner 100 for displacing a medium to be scanned 30 (FIG. 3) onto or removing the medium 30 out of the image window 23 of the image scanner 100.

It is apparent that although the invention has been described in connection with the preferable embodiment, it is contemplated that those skilled in the art may make changes to the preferred embodiment without departing from the scope of the invention as defined in the appended claims.

What is claimed is:

1. A transparency adaptor for use in an image scanner wherein said image scanner comprises a transparent image window on which a light-transmittable image medium is placeable, said transparency adaptor comprising: a casing having a base plate with side walls mounted thereto to define an interior space having an opening; a cover plate with a central opening mounted to the side walls of the casing to close the opening of the casing, the cover plate being opposite to the base plate of the casing; a transparent sheet provided to cover the central opening of the cover plate; a lighting module disposed inside the interior space, located between the transparent sheet and the base plate of the casing to provide a uniform planar light which covers a substantial area; a reflection sheet disposed between the lighting module and the base plate of the casing to direct the planar light to transmit through the transparent sheet; at least a plate-like light diffuser which is disposed between the transparent sheet and the lighting module to make the planar light more uniformly distributed through the substantial area; and power source means which provides electricity to power the lighting module, wherein said transparency adapter being adapted to be placed on the image window of the image scanner to have the light transmitting through the transparent sheet project to the image window through the light-transmittable image medium.

2. The transparency adaptor as claimed in claim 1, further comprising a handle pivotally mounted to the casing.

3. The transparency adaptor as claimed in claim 1, wherein the power source means comprises a cable adapted to connect to the image scanner to receive electricity therefrom, the cable having an end connector joining to a socket of the transparency adaptor in electrical connection with the lighting module to supply the electricity thereto.

4. The transparency adaptor as claimed in claim 1, wherein the lighting module comprises two opposite and spaced elongated cold cathode fluorescent lamps projecting light toward each other with a lighting guide plate disposed therebetween to uniformly distribute the light generated by the cold cathode fluorescent lamps through the substantial area, each of the cold cathode fluorescent lamps having two ends supported and secured to the casing by insulating caps with end terminals of the cold cathode fluorescent lamp extending through the insulating caps to electrically connect to the power source means.

5. The transparency adaptor as claimed in claim 4, wherein the lighting module comprises two light reflection members, each in the form of a U-shaped channel disposed between each of the cold cathode fluorescent lamps and the associated side wall of the casing to reflect the light generated by the cold cathode fluorescent lamps toward the lighting guide plate.

6. The transparency adaptor as claimed in claim 5, wherein the light reflection members are made of aluminum sheets.

7. The transparency adaptor as claimed in claim 4, wherein the insulating caps comprise rubber caps.

8. The transparency adaptor as claimed in claim 3, wherein the lighting module comprises two opposite and spaced elongated cold cathode fluorescent lamps projecting light toward each other with a lighting guide plate disposed therebetween to uniformly distribute the light generated by the cold cathode fluorescent lamps through the substantial area, each of the cold cathode fluorescent lamps having two ends supported and secured to the casing by insulating caps with end terminals of the cold cathode fluorescent lamp extending through the insulating caps to electrically connect to an inverter mounted inside the casing and wherein the power supply means comprises a cable adapted to connect to the image scanner to receive a direct current therefrom, the cable having an end connector joining to a socket of the inverter to supply the direct current thereto to have the direct current converted by the inverter into an alternate current which is in turn supplied to the cold cathode fluorescent lamps.

9. The transparency adaptor as claimed in claim 8, wherein the lighting module comprises two light reflection members, each in the form of a U-shaped channel disposed between each of the cold cathode fluorescent lamps and the associated side wall of the casing to reflect the light generated by the cold cathode fluorescent lamps toward the lighting guide.

10. The transparency adaptor as claimed in claim 1, further comprising a second plate-like diffuser disposed between the first plate-like diffuser and the transparent sheet.

11. The transparency adaptor as claimed in claim 10, wherein the first diffuser comprises a calibration sheet attached thereto.

* * * * *